United States Patent
Roodaki et al.

(10) Patent No.: US 12,465,451 B2
(45) Date of Patent: Nov. 11, 2025

(54) METHOD FOR OPERATING A SURGICAL MICROSCOPE, AND SURGICAL MICROSCOPE

(71) Applicant: Carl Zeiss Meditec AG, Jena (DE)

(72) Inventors: Hessam Roodaki, Oberkochen (DE); Abouzar Eslami, Oberkochen (DE); Mhd Hasan Sarhan, Oberkochen (DE)

(73) Assignee: CARL ZEISS MEDITEC AG, Jena (DE)

( * ) Notice: Subject to any disclaimer, the term of this patent is extended or adjusted under 35 U.S.C. 154(b) by 0 days.

(21) Appl. No.: 18/556,662

(22) PCT Filed: Apr. 21, 2022

(86) PCT No.: PCT/EP2022/060491
§ 371 (c)(1),
(2) Date: Oct. 7, 2024

(87) PCT Pub. No.: WO2022/223663
PCT Pub. Date: Oct. 27, 2022

(65) Prior Publication Data
US 2025/0160996 A1     May 22, 2025

(30) Foreign Application Priority Data
Apr. 22, 2021   (DE) ...................... 10 2021 204 031.4

(51) Int. Cl.
*A61B 90/20*     (2016.01)
(52) U.S. Cl.
CPC .................... *A61B 90/20* (2016.02)
(58) Field of Classification Search
CPC ......... A61B 90/20; A61B 90/30; A61B 90/50; A61B 3/13; A61B 2090/371;
(Continued)

(56) References Cited

U.S. PATENT DOCUMENTS

| 2007/0121203 A1* | 5/2007 | Riederer | G02B 21/367 |
| | | | 359/377 |
| 2019/0324252 A1 | 10/2019 | Mak et al. | |
| 2020/0409129 A1 | 12/2020 | Themelis | |

FOREIGN PATENT DOCUMENTS

| CN | 107765414 A | 3/2018 |
| CN | 110398830 A | 11/2019 |

(Continued)

OTHER PUBLICATIONS

English translation of CN 111491151. (Year: 2020).*

(Continued)

*Primary Examiner* — Jie Lei
(74) *Attorney, Agent, or Firm* — NIXON PEABODY LLP

(57) ABSTRACT

A surgical microscope and method, including: capturing a left-side image of a capturing region by a left-side camera and a right-side image of the capturing area by a right-side camera; supplying the captured images to at least one trained machine learning method and/or computer vision evaluation method of a control device of the surgical microscope; and identifying a target object on the basis of the captured images by the at least one trained machine learning method and/or computer vision evaluation method, and optimal microscope parameters and/or a change thereof and/or control commands for an actuator system of the surgical microscope are estimated, control commands for the actuator system of the surgical microscope being generated based on the estimated optimal microscope parameters and/or the estimated change in the microscope parameters, and/or the actuator system being controlled corresponding to the generated and/or estimated control commands.

10 Claims, 2 Drawing Sheets

(58) Field of Classification Search
CPC ...... A61B 2090/306; A61B 2090/3616; A61B 2090/512; A61B 2034/2065; G02B 7/00; G02B 7/001; G02B 7/002; G02B 7/006; G02B 7/028; G02B 21/00; G02B 21/0012; G02B 21/02; G02B 21/06; G02B 21/361; G06T 7/0002; G06T 2207/30168; G06T 2207/20084; G06T 2207/10056; G06T 2207/10012
USPC ....... 359/368, 481, 375, 385, 358, 802, 826; 351/41, 155, 159.01, 205, 206, 210, 221; 600/249, 473, 476
See application file for complete search history.

(56) References Cited

FOREIGN PATENT DOCUMENTS

| | | |
|---|---|---|
| CN | 111491151 A | 8/2020 |
| CN | 112002405 A | 11/2020 |
| CN | 112220562 A | 1/2021 |
| DE | 102014102080 A1 | 8/2015 |
| DE | 102018217903 A1 | 4/2020 |
| DE | 102018219867 A1 | 5/2020 |
| DE | 102019125419 A1 | 3/2021 |
| DE | 102019133174 A1 | 6/2021 |

OTHER PUBLICATIONS

International Search Report issued in International Application No. PCT/EP2022/060491 dated Aug. 3, 2022 (6 pages).
International Preliminary Report on Patentability issued in International Application No. PCT/EP2022/060491 dated Jul. 24, 2023 (11 pages).
Written Opinion of the International Searching Authority issued in International Application No. PCT/EP2022/060491 dated Aug. 3, 2022 (14 pages).
First Written Opinion of the International Preliminary Examining Authority issued in International Application No. PCT/EP2022/060491 dated Feb. 2, 2023 (14 pages).
Second Written Opinion of the International Preliminary Examining Authority issued in International Application No. PCT/EP2022/060491 dated May 5, 2023 (14 pages).
Chinese Office Action for Chinese Application No. 202280029922.8, mailed Mar. 30, 2024 (14 pages).

* cited by examiner

METHOD FOR OPERATING A SURGICAL MICROSCOPE, AND SURGICAL MICROSCOPE

CROSS-REFERENCE TO RELATED APPLICATIONS

The present application is the U.S. National Stage entry of International Application No. PCT/EP2022/060491, filed Apr. 21, 2022, which claims priority under 35 U.S.C. § 119 to German Patent Application No. 10 2021 204 031.4, filed Apr. 22, 2021, the contents of which are incorporated by reference herein in their entirety.

The invention relates to a method for operating a surgical microscope and to a surgical microscope.

When using a surgical microscope to assist in a surgery, microscope parameters must be set prior to the start of the procedure depending on the surgical target object (e.g. limbus of the eye, gliomas during craniotomy, etc.). The microscope parameters relate in particular to a position of a microscope head relative to the surgical target object and also to parameters of an imaging optical unit. In particular, the microscope parameters relate to a focus or a focus plane, a magnification, and/or a centering on the target object. This process of configuring is usually demanding and time consuming.

US 2019/0313902 A1 discloses a method and a system for the automatic centering of a visual field of the eye of a patient with great magnification during an eye surgery in an XY-plane. The method comprises automatically moving the center of the visual field to the center of a circular image captured in a real-time video signal, which is captured from the visual field of the patient's eye with high magnification during an eye surgery.

U.S. Pat. No. 9,479,759 B2 discloses an optical stereo apparatus with an autofocus feature and a corresponding autofocus method for optical stereo apparatuses. The optical stereo apparatus has imaging means, which are adapted to provide a stereo image of an object of interest by combining an image of the right eye and an image of the left eye and a control unit, which is operationally connected to the imaging means and is adapted to receive the image of the right eye and the image of the left eye and to set the focus position of the imaging means.

WO 2009/080790 A1 discloses a method for ascertaining the radius and/or the position of characteristic eye components during an eye examination or eye treatment. In the method, a digital image of at least one part of an eye is recorded with a camera. The image is correlated with ring-shaped comparison objects of different sizes in such a way that the greatest match between the image and the comparison object occurs when a ring-shaped comparison object coincides with a ring-shaped density jump of the same radius in the image. The comparison objects having a high level of local agreement with the digital image are then ascertained, and the radius and/or the position of the characteristic eye component is/are derived from these comparison objects of great agreement.

The invention is based on the object of providing a method for operating a surgical microscope and a surgical microscope, in which microscope parameters can be determined and set automatically.

According to the invention, the object is achieved by a method having the features of patent claim 1 and a surgical microscope having the features of patent claim 8. Advantageous configurations of the invention emerge from the dependent claims.

It is one of the basic ideas of the invention to use at least one trained machine learning method and/or computer vision evaluation method to estimate optimum microscope parameters and/or a change in microscope parameters and/or control commands of an actuator system of the surgical microscope on the basis of a captured left-side image representation and a captured right-side image representation. The trained at least one machine learning method identifies in particular a (surgical) target object in the image representations and estimates the optimum microscope parameters and/or the change in microscope parameters and/or the control commands for this target object. Estimating is done in particular with only one left-side image representation and only one right-side image representation. When identifying the target object, in particular a type of the target object and a position of the target object in the image representations are identified or determined. The target object can be, for example, a limbus of the eye, gliomas in craniotomy, etc. Alternatively or additionally, the (surgical) target object is identified in the image representations in particular by means of the computer vision evaluation method. The target object is identified in particular by the machine learning method and/or the computer vision evaluation method, and no prior preliminary selection and/or selection and/or marking of the target object is carried out. The optimum microscope parameters are optimized in particular with regard to a presentation of the identified target object in image representations captured subsequently, that is to say, after changing a configuration of the surgical microscope. In other words, the microscope parameters are estimated for optimum work on the surgical target object. The control device controls an actuator system of the surgical microscope for setting the optimum microscope parameters and/or the change in microscope parameters and generates control commands for this purpose. If the at least one trained machine learning method is already estimating control commands, these are implemented by means of the control device by a corresponding control of the actuator system of the surgical microscope.

In particular, a method for operating a surgical microscope is provided, wherein a left-side image representation of a capture region of the surgical microscope is captured by means of a left-side camera of the surgical microscope, wherein a right-side image representation of the capture region is captured by means of a right-side camera of the surgical microscope, wherein the captured left-side image representation and the captured right-side image representation are fed as input data to at least one trained machine learning method and/or computer vision evaluation method provided by means of a control device of the surgical microscope, and wherein, by means of the at least one trained machine learning method and/or computer vision evaluation method, a target object is identified in the captured image representations and optimum microscope parameters and/or a change in microscope parameters and/or control commands for an actuator system of the surgical microscope are estimated herefor on the basis of the captured image representations, wherein control commands for the actuator system of the surgical microscope are generated by means of the control device from the estimated optimum microscope parameters and/or the estimated change in microscope parameters, and/or wherein the actuator system is controlled according to the generated and/or estimated control commands.

Further, in particular, a surgical microscope is provided, comprising a left-side camera adapted to capture a left-side image representation of a capture region of the surgical microscope, a right-side camera adapted to capture a right-side image representation of the capture region, an actuator system adapted to set a configuration of the surgical microscope according to microscope parameters, and a control device, wherein the control device is adapted to provide at least one trained machine learning method and/or computer vision evaluation method, to feed the captured left-side image representation and the captured right-side image representation as input data to the at least one trained machine learning method and/or computer vision evaluation method, wherein the at least one trained machine learning method and/or computer vision evaluation method is adapted and/or trained to identify a target object in the captured image representations and to estimate and provide herefor optimum microscope parameters and/or a change in microscope parameters and/or control commands for the actuator system on the basis of the captured image representations, wherein the control device is further adapted to generate control commands for the actuator system of the surgical microscope from the estimated optimum microscope parameters and/or the estimated change in microscope parameters, and/or to control the actuator system of the surgical microscope according to the generated and/or estimated control commands.

It is an advantage of the method and the surgical microscope that an adjustment of the surgical microscope can be performed more quickly. The at least one trained machine learning method and/or computer vision evaluation method estimates the optimum microscope parameters and/or the change in microscope parameters and/or the control commands in particular in a single iteration, that is to say, no intermediate iterations are necessary. In particular, no optimization loops are necessary, and the optimum microscope parameters and/or the change in microscope parameters and/or the control commands are instead available after a single application of the at least one trained machine learning method and/or computer vision evaluation method. In particular, the at least one trained machine learning method and/or computer vision evaluation method estimates the optimum microscope parameters and/or the change in microscope parameters and/or the control commands (for setting the optimum microscope parameters) on the basis of a (single) captured left-side image representation and a (single) captured right-side image representation. This enables a particularly fast and time-saving estimation and provision of the optimum microscope parameters and/or the change in microscope parameters and/or the control commands. The target object is identified in particular exclusively by the at least one trained machine learning method and/or computer vision evaluation method. Here, the at least one trained machine learning method and/or computer vision evaluation method detects the target object in the captured left-side image representation and in the captured right-side image representation. In particular, a prior preliminary selection and/or selection and/or marking of the target object is not necessary, and so the identification and estimation take place in particular without a prior preliminary selection and/or selection and/or marking of the target object. A position specification is also not necessary, which means that the identification and estimation take place in particular without a position specification or position marking of the target object. Optimum microscope parameters and/or a change in microscope parameters and/or control commands (for setting optimum microscope parameters) can already be provided by means of the at least one trained machine learning method and/or computer vision evaluation method after the capture of a (single) left-side image representation and a (single) right-side image representation. In particular, the method and the surgical microscope allow the surgical microscope to be automatically configured in an optimum manner, i.e., in particular in a desired and/or preferred target configuration, for a surgical target object. After performing the method, a surgeon can start the surgery directly or can start an intermediate step of the surgery. In order to generate the control commands, it is in particular not necessary in this way to record or capture a temporal sequence of image representations or a video sequence. In particular, the presence of a single right-side or left-side image representation of a stereo image representation may already be sufficient to generate the control commands.

The surgical microscope is in particular a stereoscopic surgical microscope, in which a left and a right beam path enable stereoscopic capture of the capture region. The left beam path allows the capture region to be captured by means of the left camera. The right beam path allows the capture region to be captured by means of the right camera. This allows capture of a left image representation and a right image representation. Owing to a parallax effect occurring in the process, it is also possible in particular to acquire depth information from the capture region, with the information also being evaluated in particular by the at least one trained machine learning method.

The actuator system of the surgical microscope comprises in particular actuators and/or motors. In particular a position of a microscope head can be changed by means of the actuator system of the surgical microscope, wherein the microscope head comprises in particular an imaging optical unit of the surgical microscope. Furthermore, in particular positions of lenses in the imaging optical unit of the surgical microscope can be changed by means of the actuator system. The actuator system is controlled by means of the control device in an open and/or closed loop, wherein the actuator system can to this end have a sensor system for capturing an actual state.

Microscope parameters comprise in particular a position of the microscope head (e.g. in the x, y and z direction) and also parameters of an imaging optical unit (e.g. magnification factor, etc.). In particular, the microscope parameters relate to a focus or a focus plane, a magnification, and/or a centering on the target object. A focus is achieved in particular by changing a distance of the microscope head from the target object (in particular by a movement in the z direction). The centering is carried out in particular by changing a position of the microscope head, wherein the latter is moved in particular in a plane parallel to an object plane (also referred to as xy plane). The magnification is achieved in particular by changing a lens position of lenses in the imaging optical unit of the surgical microscope.

A change in microscope parameters in particular refers to difference values for the microscope parameters, which must be set on the basis of current microscope parameters (actual microscope parameters) for achieving the optimum microscope parameters (target microscope parameters or target configuration).

Actuator system control commands are in particular control commands that must be set on the basis of current microscope parameters (actual microscope parameters) for achieving the optimum microscope parameters (target microscope parameters).

Parts of the control device can be embodied individually or together as a combination of hardware and software, for example in the form of program code that is executed on a microcontroller or microprocessor. However, it may also be possible for parts to be designed individually or together as application-specific integrated circuits (ASICs) or field-programmable gate arrays (FPGAs). In particular, the control device comprises at least one computing device and at least one memory.

The trained machine learning method is or has been trained in the course of a training phase preceding the method using at least one training data set. Such a training data set comprises pairs of a right and a left image representation, which are annotated at least with optimum microscope parameters and/or a change in microscope parameters and/or control commands for the actuator system of the surgical microscope. The annotation forms the ground truth when training the at least one machine learning method. Provision may also be made for a type and a position of the surgical target in the pairwise image representations to be specified as an annotation or ground truth. The training itself takes place in a familiar way, for example by means of supervised learning. The optimum microscope parameters are determined or defined in particular manually based on a desired optimum configuration of the surgical microscope. In other words: it is defined in particular manually with which configuration optimum work can or should be performed on a surgical target object. The respective target configuration is used as the ground truth for annotating the image representations which have been captured in each case appropriately pairwise.

In an alternative, the target object is identified in the captured image representations alternatively or additionally by means of an (at least one) computer vision evaluation method and optimum microscope parameters and/or a change in microscope parameters and/or control commands for the actuator system of the surgical microscope are estimated herefor on the basis of the captured image representations. In the following text, an embodiment of the computer vision evaluation method is described as an example using an eye limbus as a target object. After the left-side and the right-side image representations have been captured, a plurality of ring-shaped templates (image representations) are correlated with the captured image representations using signals. In particular, a local correlation with the captured image representations takes place here. The templates (image representations) comprise or contain in each case rings of different sizes (or different diameters). A large correlation value between one of the templates (image representations) and the captured image representations here means a match. The greatest correlation value determines a position and a radius of the limbus in the captured image representations. If the correlation value is greater than a specified threshold value, the (surgical) target object, in this example the limbus, has been successfully recognized. Otherwise, the (surgical) target object, i.e. the limbus, could not be recognized in the captured image representations. In this case, the method will in particular be terminated without success. The result with the highest correlation value can then be used to determine the midposition of the limbus in the two captured image representations (this is in particular the midpoint of the respective ring in the template at the position having the greatest correlation value). Starting from the (surgical) target object identified in this way, in the example starting from the midposition of the limbus in the two captured image representations, optimum microscope parameters and/or a change in microscope parameters and/or control commands for the actuator system of the surgical microscope can then be estimated. For example, the respective determined midposition can be moved to the center of the respective capture region of the cameras. The finding of the eye limbus in a captured image representation of the eye is described, for example, in WO 2009/080790 A1. If other (surgical) target objects are to be identified, then in particular templates (image representations) which are adapted and/or suitable therefor are used. However, the procedure for other (surgical) target objects is basically the same.

In one embodiment, provision is made for microscope parameters set during the capture of the image representations to be also additionally fed as input data to the at least one trained machine learning method. Thereby, in particular the actual microscope parameters are fed to the at least one trained machine learning method during the capture of the two image representations. This can improve accuracy when estimating the microscope parameters and/or changing the microscope parameters and/or the control commands. Accordingly, such actual microscope parameters are also already taken into consideration during the training phase of the at least one machine learning method as respective annotation or ground truth regarding the pairs of image representations in the training data. In particular, this consideration allows for improved management of different size scales of similar surgical target objects, in particular as opposed to different magnification levels.

In one embodiment, provision is made for a type of a surgery and/or a phase of the surgery to be detected and/or received and to be fed as input data to the trained machine learning method. This can improve the accuracy of the identification of the surgical target object and the estimation of the microscope parameters and/or the change in microscope parameters and/or control commands. The type of the surgery and/or the phase of the surgery can, for example, be queried from a user by means of a user interface and/or detected. It is also possible to obtain the type of the surgery and/or the phase of the surgery from another source. For example, a database can provide this information, and/or this information can be retrieved from a surgery plan and/or a surgery log. The type of the surgery and/or the phase of the surgery are then also already taken into consideration in the training phase as ground truth linked to the respective pairs of image representations.

In one embodiment, provision is made for a type of a surgery and/or a phase of the surgery to be detected and/or received, wherein the at least one trained machine learning method and/or computer vision evaluation method is selected from a plurality of trained machine learning methods and/or computer vision evaluation methods depending on the type of the surgery and/or the phase of the surgery, wherein the selected at least one trained machine learning method and/or computer vision evaluation method is used. Thereby, a machine learning method and/or computer vision evaluation method specialized for the type of the surgery and/or the phase of the surgery can be selected and made available. This makes it possible to increase accuracy. Furthermore, a specialized machine learning method typically requires less computing power during application, which can save resources. In particular, a specialized machine learning method can usually be carried out more quickly. Accordingly, a plurality of machine learning methods specialized for the type and/or phase of the surgeries are correspondingly generated or trained in a training phase.

In a corresponding embodiment of the surgical microscope, provision is made for the surgical microscope to have at least one interface, wherein the at least one interface is adapted to detect and/or receive a type of a surgery and/or a phase of the surgery, wherein the control device is further adapted to feed the type of the surgery and/or the phase of the surgery as input data to the at least one trained machine learning method and/or to select the at least one trained machine learning method and/or computer vision evaluation method from a plurality of trained machine learning methods and/or computer vision evaluation methods depending on the type of the surgery and/or the phase of the surgery and to make available the selected at least one trained machine learning method and/or computer vision evaluation method for use. The at least one interface can be, for example, a user interface in the form of a display and operating device. Alternatively or additionally, the interface can also be used for connecting to a data processing system which provides, for example, a surgery plan and feeds the type of the surgery and/or the phase of the surgery to the interface on the basis of the surgery plan.

In one embodiment, provision is made for the at least one trained machine learning method and/or computer vision evaluation method to estimate and provide a confidence value for each estimated output, wherein the confidence value provided is compared with a specified threshold value, wherein the method is aborted if the confidence value provided is below the specified threshold value. Thereby it can be ensured that the identification of the surgical target object and/or the estimation of the microscope parameters and/or the change in microscope parameters and/or control commands has a specified confidence, and the microscope parameters and/or the change in microscope parameters and/or the control commands are set or changed only when a sufficient confidence has been reached. In particular, this can prevent incorrect operational control or malfunction of the surgical microscope. The confidence value and threshold value can also be in the form of vectors with multiple entries each. The entries are then compared individually with one another.

In one embodiment, provision is made for a start command to be detected as input, wherein the capture of the image representations, the identification and the estimation of the optimum microscope parameters and/or the change in microscope parameters and/or control commands and the controlling are started when the start command has been detected. This allows the method to be started whenever a user, in particular a surgeon or assistant, wishes to do so.

In a corresponding embodiment of the surgical microscope, the surgical microscope has a user interface, wherein the user interface is adapted to detect a start command as input, wherein the control device is adapted to start the capture of the image representations and the estimation of the optimum microscope parameters and/or the change in microscope parameters and/or control commands and the controlling when the start command has been detected. The user interface may comprise, for example, an operating element, for example a button, with which the method can be initiated. In particular, by means of the user interface, in particular by means of the button, an automated setting of a magnification, a focus and/or a centering on the surgical target object can be started according to the method.

In one embodiment, provision is made for the at least one trained machine learning method to comprise at least one trained neural network. In particular, the trained neural network can be a trained convolutional neural network (CNN). In principle, however, other machine learning methods can also be used.

Further features relating to the configuration of the surgical microscope arise from the description of configurations of the method. Here, the advantages of the surgical microscope are respectively the same as in the configurations of the method.

The invention is explained in greater detail below on the basis of preferred exemplary embodiments with reference to the figures. In the figures.

Figure 1:
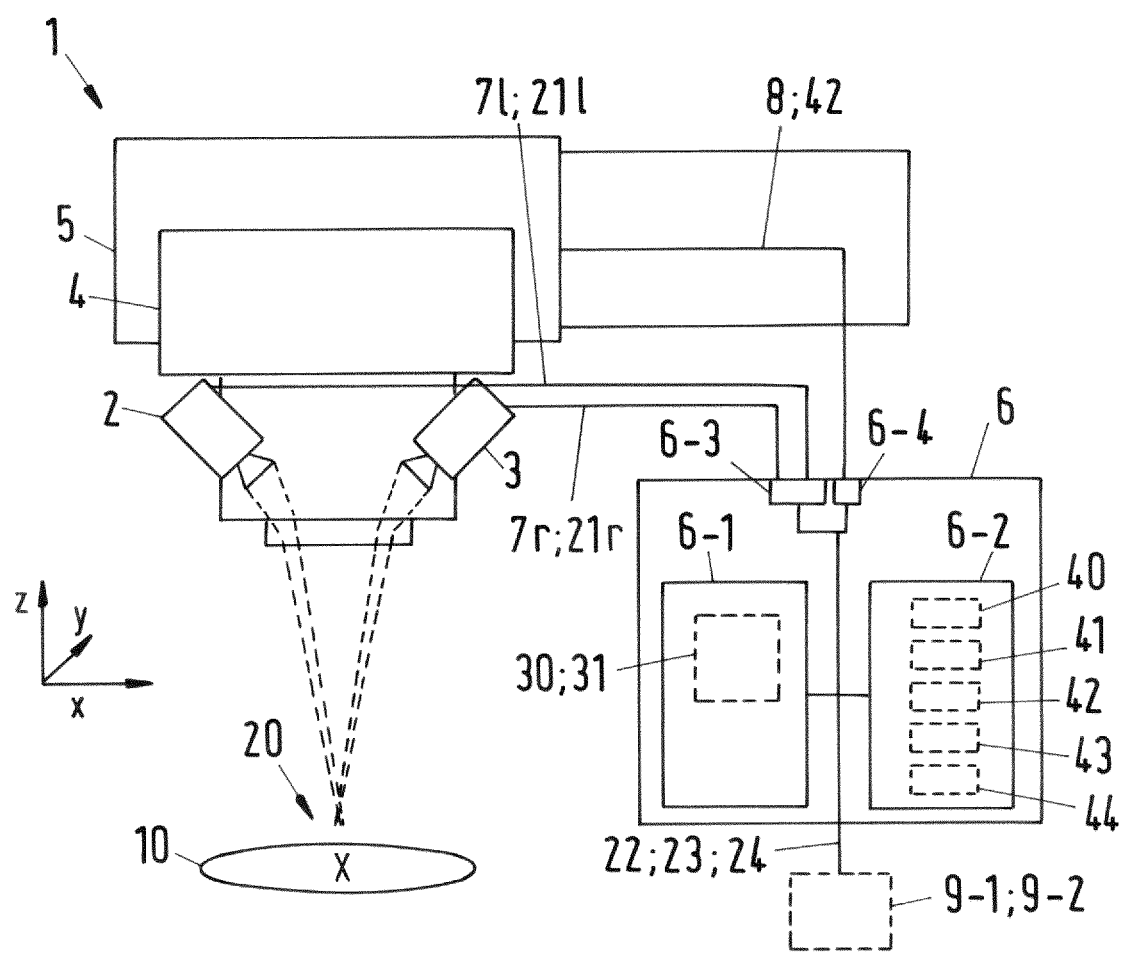
FIG. 1 shows a schematic illustration of one embodiment of the surgical microscope.

FIG. 1 shows a schematic illustration of one embodiment of the surgical microscope 1. The surgical microscope 1 comprises a left-side camera 2, a right-side camera 3, and an actuator system 5 arranged in a microscope head 4. The left-side camera 2 and the right-side camera 3 are arranged on a beam path of a stereoscopic imaging optical unit. The actuator system 5, for example, comprises actuators and stepper motors. Furthermore, the surgical microscope 1 comprises a control device 6. The control device 6 comprises a computing device 6-1 and a memory 6-2. The computing device 6-1 comprises at least one microprocessor. The computing device 6-1 can access data stored in the memory 6-2 and can carry out computing operations on the data. In particular, the computing device 6-1 executes a program code stored in the memory 6-2 in order to perform measures of the method described in this disclosure. The control device 6 further comprises interfaces 6-3, 6-4, which are connected via signal lines 7l, 7r, 8 to the cameras 2, 3 and the actuator system 5.

In the following text, an embodiment of the method for operating a surgical microscope 1 is explained using the surgical microscope 1.

A surgical target object 20 is arranged in a capture region 10 of the surgical microscope 1. This can be, for example, a limbus of the eye or gliomas in craniotomy, etc.

A left-side image representation 21l of the capture region 10 is captured by means of the left-side camera 2. By means of the right-side camera 3, a right-side image representation 21r of the capture region 10 is captured, in particular at the same time. The image representations 21l, 21r together form in particular a stereoscopic image representation. The captured image representations 21l, 21r are fed to the control device 6 via the interface 6-3.

The control device 6 makes available a trained machine learning method 30. For this purpose, a description of the trained machine learning method 30 is stored in the memory 6-2 and is carried out to be made available by the computing device 6-1. In particular, the trained machine learning method 30 comprises a trained neural network 31, in particular a convolutional neural network. A structure description and parameters (filter parameters, weightings, etc.) of the neural network 31 are stored in the memory 6-2. The computing device 6-2 makes available the trained neural network 31 according to the structure description and the parameters or executes it accordingly.

The captured left-side image representation 21l and the captured right-side image representation 21r are fed as input data to the trained machine learning method 30 that has been made available, in particular to the trained neural network 31.

By means of the trained machine learning method 30, in particular by means of the trained neural network 31, a target object 20 in the captured image representations 21l, 21r is identified and optimum microscope parameters 40 and/or a change 41 in microscope parameters 40 and/or control commands 42 for the actuator system 5 of the surgical microscope 1 are estimated herefor on the basis of the captured image representations 21l, 21r.

Whether optimum microscope parameters 40 and/or a change 41 in microscope parameters 40 or whether control commands 42 are estimated by the trained machine learning method 30, in particular the trained neural network 31, depends on how the trained machine learning method 30 is designed, that is to say, what a structure of the at least one machine learning method 30 is like and for what it was trained in a training phase.

If optimum microscope parameters 40 and/or a change 41 in microscope parameters 40 were estimated, control commands for an actuator system 5 of the surgical microscope 1 are generated by means of the control device 6 from the estimated optimum microscope parameters 40 and/or the estimated change 41 in the microscope parameters 40. The control device 6 controls the actuator system 5 according to the generated control commands 42.

If control commands 42 were estimated for the actuator system 4, the control device 6 controls the actuator system 4 according to the estimated control commands 42.

The optimum microscope parameters 40 comprise in particular parameters for a focus, magnification and centering of the microscope head 5. The parameters for the focus are set in particular by moving the microscope head 4 in the z direction. Magnification parameters are set in particular by changing a position of lenses in an imaging optical unit in the microscope head 4. Parameters for centering the microscope head 4 are set in particular by moving the microscope head 4 in the x-y direction. In principle, the optimum microscope parameters 40 may also comprise other parameters of the surgical microscope 1, e.g., parameters of a light source of the surgical microscope and/or camera parameters etc.

Alternatively or additionally, the target object 20 is identified in the captured image representations 21l, 21r by means of an (at least one) computer vision evaluation method and optimum microscope parameters 40 and/or a change 41 in microscope parameters 40 and/or control commands 42 for the actuator system 5 of the surgical microscope 1 are estimated herefor on the basis of the captured image representations 21l, 21r. The method was already explained as an example in the general description.

Provision may be made for microscope parameters 43 set during the capture of the image representations 21l, 21r to be also additionally fed as input data to the trained machine learning method 30, in particular the trained neural network 31. These microscope parameters 43 can also be referred to as actual microscope parameters, since they describe an actual state of a configuration of the surgical microscope 1 during the capture of the image representations 21l, 21r. These actual microscope parameters 43 comprise in particular parameters for a focus, magnification and/or centering of the surgical microscope 1.

Provision may be made for a type 22 of a surgery and/or a phase 23 of the surgery to be detected and/or received and to be fed as input data to the trained machine learning method 30, in particular the trained neural network 31. For this purpose, the surgical microscope 1 has an interface 9-1 with which the type 22 of the surgery and/or the phase 23 of the surgery can be detected and/or received. For the detection, the interface 9-1 is designed, for example, as a user interface 9-2, so that a user, in particular a surgeon or an assistant, can enter the type 22 and/or the phase 23 of the surgery. Alternatively or additionally, the type 22 and/or the phase 23 of the surgery can also be queried from and/or made available by a surgery planning system, which provides, for example, a surgery plan.

Provision may also be made for the type 22 of the surgery and/or the phase 23 of the surgery to be detected and/or received, wherein the trained machine learning method 30, in particular the trained neural network 31, and/or the computer vision evaluation method is selected from a plurality of trained machine learning methods 30, in particular a plurality of trained neural networks 31, and/or computer vision evaluation methods depending on the type 22 of the surgery and/or the phase 23 of the surgery, wherein the selected trained machine learning method 30, in particular the selected trained neural network 31, and/or the selected computer vision evaluation method is used.

Provision may be made for the trained machine learning method 30, in particular the trained neural network 31, and/or the computer vision evaluation method to estimate and provide a confidence value for each estimated output, wherein the confidence value provided is compared with a specified threshold value 44, wherein the method is aborted if the confidence value provided is below the specified threshold value 44. An output of the trained machine learning method 30, in particular of the trained neural network 31, and/or of the computer vision evaluation method can comprise both an estimated surgical target object 20 and also optimum microscope parameters 40 and/or a change 41 in microscope parameters 40 and/or control commands 42 for the actuator system 5. In particular, a confidence value of the estimation is provided for the respective output values and compared with the specified threshold value 44. Accordingly, the confidence value and the specified threshold value 44 can also be configured as vectors with a plurality of entries according to the respective output values. Thereby, a configuration of the surgical microscope 1 is changed only if a minimum degree of security is achieved during the identification of the surgical target object 20 and/or during the estimation. Otherwise, the configuration of the surgical microscope will not be changed.

Provision may be made for a start command 24 to be detected as input, wherein the capture of the image representations 21l, 21r, the identification and the estimation of the optimum microscope parameters 40 and/or the change 41 in microscope parameters 40 and/or control commands 42 and the controlling are started when the start command 24 has been detected. For this purpose, the surgical microscope 1 has a user interface 9-2. The latter may comprise, for example, an operating element in the form of a button with which the start command 24 for starting the measures of the method can be given by a user, in particular by a surgeon or an assistant.

Figure 2:
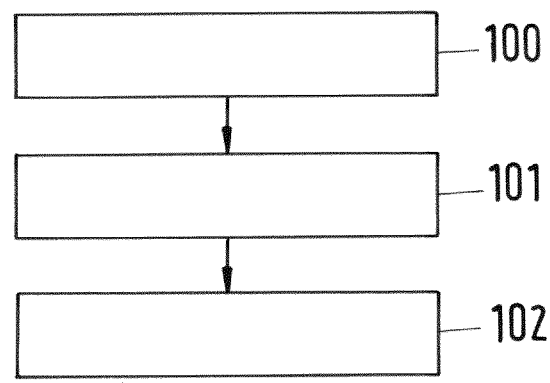
FIG. 2 shows a schematic flowchart for elucidating a training phase of the machine learning method.

FIG. 2 shows a schematic flowchart to elucidate a sequence of a training phase of the at least one machine learning method, in particular the trained at least one neural network.

A training data set is compiled in a measure 100. In this case, image representations captured on the left and on the right side (stereo image representations) are provided in pairs with annotations, i.e., linked to a ground truth. The image representations show a surgical target object (e.g., a center of a limbus of the eye, gliomas in craniotomy, etc.). Depending on the design, the annotations comprise optimum microscope parameters (e.g. as optimum x-y-z positions of a microscope head and lens positions or a magnification specification of an imaging optical unit: 7.5×, etc.) and/or a change in microscope parameters (e.g., in the form of difference values; e.g., as x-y-z position difference: 200 μm in the x direction, −400 μm in the y direction, etc.) and/or control commands for an actuator system of the surgical microscope. The optimum microscope parameters are determined in particular manually based on a desired optimum configuration of the surgical microscope. In other words: it is defined in particular manually with what configuration optimum work can or should be performed on a surgical target object. The respective target configuration is used as the ground truth for annotating the image representations which have been captured in each case appropriately pairwise.

Provision may also be made for the training data set to comprise further data. This can increase in particular the accuracy during the estimation. The further data may be in particular microscope parameters which describe an actual state or an actual configuration of the surgical microscope during the capture of the respective pairwise image representations (stereo image representations). In particular, they are an actual state of a focus (e.g., in the form of a z position, see FIG. 1), a magnification (e.g., 3.2× etc.) and a centering or a position of a microscope head (e.g., an x-y position of a microscope head). The further data may also comprise properties of the surgical microscope (for example, a type of objective lens, e.g., 200f, etc.).

In a measure 101, the image representations provided in pairs are fed as input data to the machine learning method to be trained. An estimated output of the machine learning method is then compared with the ground truth in order to set parameters of the machine learning method on the basis of a comparison result. This is done for the entire training data set in a plurality of iterations in a manner known per se, for example by means of supervised learning. The training is continued until a specified functional quality is achieved when estimating. The training data set can also be divided into two parts, wherein one part is used for training and the other part for testing the functional quality.

In a measure 102, the trained machine learning method, in particular in the form of a structure description and parameters (filter parameters, weightings, etc.), is loaded into a memory of the control device of the surgical microscope. The control device can then apply the trained machine learning method and make available its functionality.

Provision may be made for a machine learning method for a plurality of surgical target objects to be trained and used. However, provision may also be made for training specially trained machine learning methods depending on a type and/or phase of a surgery and selecting them and making them available for the respective application. This can reduce the computing power required when applying the specialized machine learning method.

The machine learning method comprises in particular at least one neural network, in particular at least one convolutional neural network.

Figure 3:
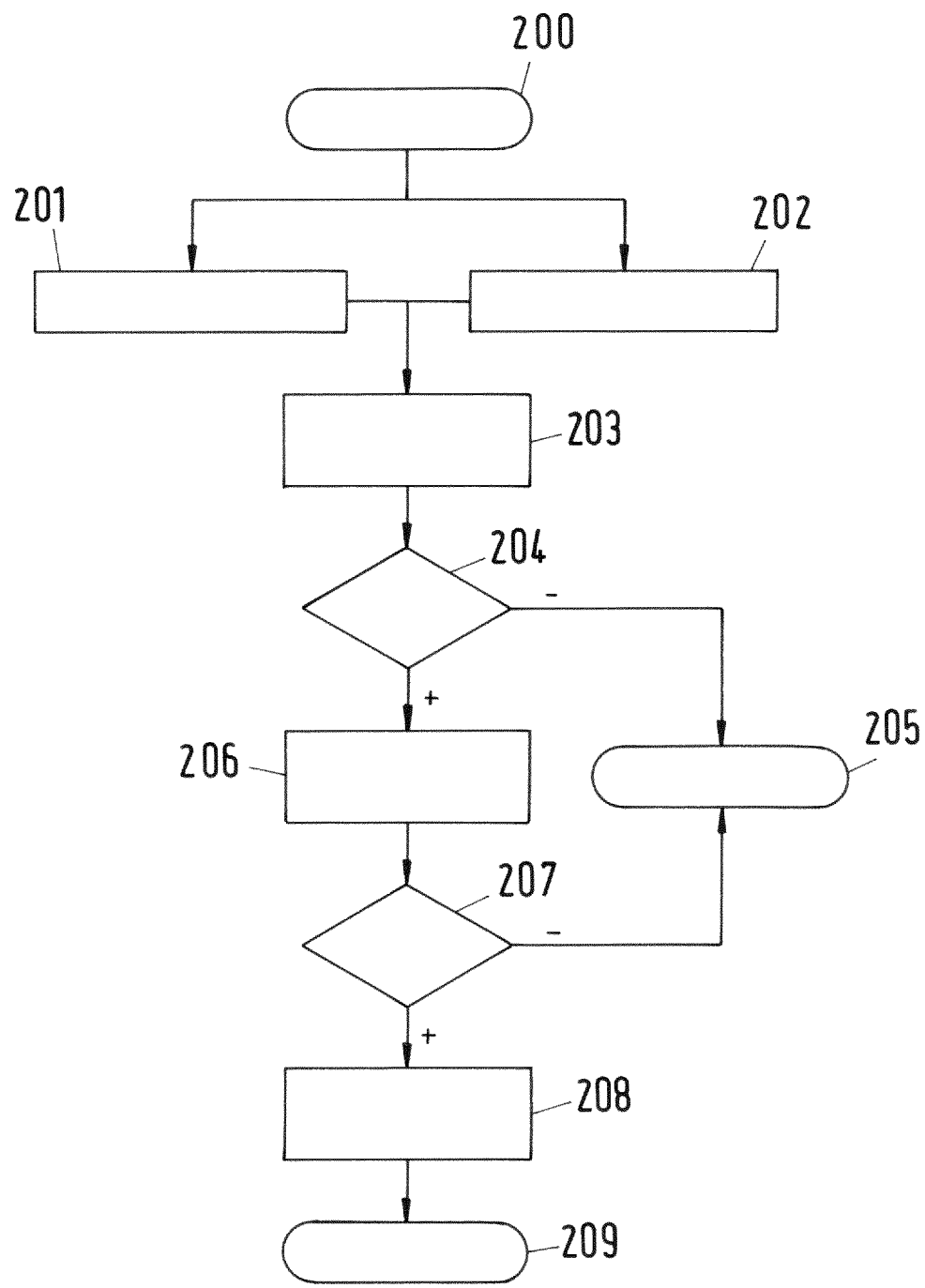
FIG. 3 shows a schematic flowchart of an embodiment of the method for operating a surgical microscope.

FIG. 3 shows a schematic flowchart of an embodiment of the method for operating a surgical microscope. The measures of the method are started 200 as soon as a start command has been detected, for example at a user interface of the surgical microscope.

After starting the measures, a left-side image representation of a capture region is captured by means of a left-side camera of the surgical microscope and, at the same time, a right-side image representation of a capture region is captured by means of a right-side camera of the surgical microscope in measures 201, 202.

In a measure 203, a (surgical) target object in the captured image representations is identified by means of at least one trained machine learning method, in particular by means of at least one trained neural network, on the basis of the captured image representations. The surgical target object may be, for example, a limbus of an eye or gliomas.

A measure 204 checks whether a confidence when identifying the surgical target object exceeds a specified threshold value. A confidence value is estimated and provided here for each output in particular by the at least one trained machine learning method. For example, for a plurality of possible surgical target objects, respective probabilities for a surgical target object of a particular type being present (at an estimated position in the image representations) are estimated, with a confidence value being estimated for each of the probabilities. Typically, the surgical target object for which the highest probability value (as confidence) is indicated is selected from the result. This probability value or the estimated confidence is then compared with the specified threshold value.

If the estimated confidence does not reach the specified threshold value, the method is aborted and terminated without success in a measure 205. Provision may be made for a corresponding error message to be output, for example on a display device of the surgical microscope.

If, on the other hand, the estimated confidence reaches or exceeds the specified threshold value, optimum microscope parameters and/or a change in microscope parameters and/or control commands for an actuator system of the surgical microscope are estimated in a measure 206 by means of the at least one trained machine learning method, in particular by means of the at least one trained neural network.

Measures 203 and 206 can be carried out by means of a (single) trained machine learning method. However, provision may also be made for measures 203 and 206 to be carried out by two separate trained machine learning methods.

A measure 207 checks whether the estimated optimum microscope parameters and/or the change in microscope parameters and/or the control commands can be set. For example, it may occur that the desired target configuration of the surgical microscope is outside a possible parameter range of actuators, etc., for example because a movement of the microscope head necessary for optimum centering lies outside the possible range of motion.

If the target configuration cannot be set, the method is aborted and terminated without success in a measure 205. Provision may be made for a corresponding error message to be output, for example on a display device of the surgical microscope.

If, on the other hand, the target configuration can be set, the target configuration is set in a measure 208. For this purpose, depending on what has been estimated by the at least one machine learning method, in particular by the at least one neural network, control commands for an actuator system of the surgical microscope are generated from the estimated microscope parameters and/or the estimated change in microscope parameters and transmitted to the actuator system. If, on the other hand, control commands were estimated by the at least one trained machine learning method, in particular by the trained at least one neural network, the estimated control commands are fed to the actuator system.

If the target configuration is set, the method is successfully terminated in a measure 209. Provision may be made here for a corresponding success notification to be output, for example on a display device of the surgical microscope.

The method and the surgical microscope allow the surgical microscope to be configured automatically for microscope parameters that are optimum for a recognized surgical target object. This can improve the workflow during surgery.

LIST OF REFERENCE SIGNS

1 Surgical microscope
2 Left-side camera

3 Right-side camera
4 Microscope head
5 Actuator system
6 Control device
6-1 Computing device
6-2 Memory
6-3 Interface
6-4 Interface
7*l* Signal line (left-side camera)
7*r* Signal line (right-side camera)
8 Signal line (actuator system)
9-1 Interface
9-2 User interface
10 Capture region
20 (Surgical) target object
21*l* Left-side image representation
21*r* Right-side image representation
22 Type of surgery
23 Phase of surgery
24 Start command
30 Trained machine learning method
31 Trained neural network
40 Optimum microscope parameters
41 Change in microscope parameters
42 Control commands
43 Adjusted microscope parameters
44 Threshold value (for confidence)
100-102 Measures (training phase)
200-209 Measures of the method

The invention claimed is:

1. A method for operating a surgical microscope, the method comprising:
wherein a left-side image representation of a capture region of the surgical microscope is captured by a left-side camera of the surgical microscope,
wherein a right-side image representation of the capture region is captured by a right-side camera of the surgical microscope,
wherein the captured left-side image representation and the captured right-side image representation are fed as input data to at least one trained machine learning method and/or computer vision evaluation method that is made available by a control device of the surgical microscope,
wherein, by the at least one trained machine learning method and/or computer vision evaluation method, a target object in the captured image representations is identified,
wherein a type of the target object and a position of the target object are determined in the image representations during the identification of the target object, and
wherein optimum microscope parameters and/or a change in microscope parameters and/or control commands for an actuator system of the surgical microscope are estimated for the identified target object based on the captured image representations,
wherein control commands for the actuator system of the surgical microscope are generated by the control device from the estimated optimum microscope parameters and/or the estimated change in microscope parameters, and/or wherein the actuator system is controlled according to the generated and/or estimated control commands, wherein the at least one trained machine learning method and/or computer vision evaluation method estimates and provides a confidence value for each estimated output, wherein the estimated output comprises the identified target object, wherein the confidence value provided is compared with a specified threshold value, wherein the method for operating the surgical microscope is aborted if the confidence value provided is below the specified threshold value.

2. The method as claimed in claim 1, wherein microscope parameters set during the capture of the image representations are also additionally fed as input data to the at least one trained machine learning method.

3. The method as claimed in claim 1, wherein a type of a surgery and/or a phase of the surgery is/are detected and/or received and fed as input data to the trained machine learning method.

4. The method as claimed in claim 1, wherein a type of a surgery and/or a phase of the surgery are detected and/or received, wherein the at least one trained machine learning method and/or computer vision evaluation method is selected from a plurality of trained machine learning methods and/or computer vision evaluation methods depending on the type of the surgery and/or the phase of the surgery, wherein the selected at least one trained machine learning method and/or computer vision evaluation method is used.

5. The method as claimed in claim 1, wherein the identification of the target object takes place by the at least one trained machine learning method and/or computer vision evaluation method, and the estimation of the optimum microscope parameters and/or the change in microscope parameters and/or control commands for the actuator system takes place on the basis of a single captured left-side image representation and a single captured right-side image representation.

6. The method as claimed in claim 1, wherein a start command is detected as input, wherein the capture of the image representations, the identification and the estimation of the optimum microscope parameters and/or the change in microscope parameters and/or control commands and the controlling are started when the start command has been detected.

7. The method as claimed in claim 1, wherein the at least one trained machine learning method comprises at least one trained neural network.

8. A surgical microscope comprising:
a left-side camera adapted to capture a left-side image representation of a capture region of the surgical microscope,
a right-side camera adapted to capture a right-side image representation of the capture region,
an actuator system adapted to set a configuration of the surgical microscope according to microscope parameters, and
a control device, wherein the control device is adapted to make available at least one trained machine learning method and/or computer vision evaluation method, to feed the captured left-side image representation and the captured right-side image representation as input data to the at least one trained machine learning method and/or computer vision evaluation method,
wherein the at least one trained machine learning method and/or computer vision evaluation method is adapted and/or trained to identify a target object in the captured image representations and to determine a type of the target object and a position of the target object in the image representations during the identification of the target object, and to estimate and provide herefor optimum microscope parameters and/or a change in microscope parameters and/or control commands for the actuator system on the basis of the captured image representations, wherein the control device is further adapted to generate control commands for the actuator system of the surgical microscope from the estimated optimum microscope parameters and/or the estimated change in microscope parameters and/or to control the actuator system of the surgical microscope according to the generated and/or estimated control commands, wherein the at least one trained machine learning method and/or computer vision evaluation method estimates and provides a confidence value for each estimated output, wherein the estimated output comprises the identified target object, wherein the control device is further adapted to compare the confidence value provided with a specified threshold value and to stop the control device if the confidence value provided is below the specified threshold value.

9. The surgical microscope as claimed in claim 8, further comprising at least one interface, wherein the at least one interface is adapted to detect and/or receive a type of a surgery and/or a phase of the surgery, wherein the control device is further adapted to feed the type of the surgery and/or the phase of the surgery as input data to the at least one trained machine learning method and/or to select the at least one trained machine learning method and/or computer vision evaluation method from a plurality of trained machine learning methods and/or computer vision evaluation methods depending on the type of the surgery and/or the phase of the surgery, and to make available the selected at least one trained machine learning method and/or computer vision evaluation method for use.

10. The surgical microscope as claimed in claim 8, further comprising a user interface, wherein the user interface is adapted to capture a start command as input, wherein the control device is adapted to start the capture of the image representations and the estimation of the optimum microscope parameters and/or the change in microscope parameters and/or control commands and the controlling when the start command has been detected.

\* \* \* \* \*